United States Patent [19]
Klinefelter

[11] Patent Number: 5,347,593
[45] Date of Patent: Sep. 13, 1994

[54] CHARACTER RECOGNITION SYSTEM
[75] Inventor: Gary M. Klinefelter, Eden Prairie, Minn.
[73] Assignee: Soricon Corporation, Boulder, Colo.
[21] Appl. No.: 932,618
[22] Filed: Aug. 20, 1992
[51] Int. Cl.⁵ ............................................. G06K 9/46
[52] U.S. Cl. ...................................... 382/29; 382/7; 382/64
[58] Field of Search .................. 382/29, 10, 7, 64, 11; G06K 9/00, 9/52, 9/20, 7/08

[56] References Cited
U.S. PATENT DOCUMENTS
3,391,387  7/1968  Flores ............................. 340/146.3
3,571,793  3/1971  Britt ............................... 340/146.3
3,818,446  6/1974  Benson ........................... 340/146.3
4,143,355  3/1979  MacIntyre ..................... 340/146.3
4,984,281  1/1991  Matsuhashi ........................ 382/7
5,134,663  7/1992  Kozlowski ........................ 382/29

Primary Examiner—Yon J. Couso
Attorney, Agent, or Firm—Rosen, Dainow & Jacobs

[57] ABSTRACT

An arrangement for acquiring signal representatives intended to correspond to character representations, out of a set of possible character representations, provided on a substrate that emanate magnetic fields which can be sensed to provide a related waveform. Times of extrema of the waveform are ordered and compared with the ordering of time locations in waveforms expected for the set of possible characters with different orderings being used to eliminate those possible characters having expected waveforms incompatible with the extrema ordered times of the measured waveform.

20 Claims, 13 Drawing Sheets

Fig. 9A

DETERMINE MAGNETIC CHARACTER FROM STORED PEAKS AND CORRESPONDING SUBINTERVALS

↓

STORE INDICATORS FOR SUBINTERVALS HAVING 3 MOST POSITIVE AND 3 MOST NEGATIVE CHARACTER WAVEFORM PEAKS

↓

SET 3 PEAK AND 2 PEAK CHARACTER REGISTERS

↓

LOGICALLY AND 3 PEAK CHARACTER REGISTER CONTENTS WITH CONTENTS OF THOSE 3 PEAK ELIMINATOR REGISTERS ASSOCIATED WITH 2 MOST POSITIVE AND 2 MOST NEGATIVE CHARACTER WAVEFORM PEAK SUBINTERVALS TO PROVIDE FIRST LOGIC RESULTS IN 3 PEAK CHARACTER REGISTER

↓

LOGICALLY AND FIRST LOGIC RESULT CONTENTS OF THAT 3 PEAK ELIMINATOR REGISTER ASSOCIATED WITH THIRD MOST POSITIVE PEAK SUBINTERVAL TO PROVIDE SECOND LOGIC RESULTS IN 3 PEAK CHARACTER REGISTER

↓

SECOND LOGIC RESULTS ALL ZERO?

— YES → RESTORE FIRST LOGIC RESULTS IN 3 PEAK CHARACTER REGISTER

— NO ↓

| NO branch | YES branch |
|---|---|
| LOGICALLY AND SECOND LOGIC RESULTS WITH CONTENTS OF 3 PEAK ELIMINATOR REGISTER ASSOCIATED WITH THIRD MOST NEGATIVE PEAK TO PROVIDE THIRD LOGIC RESULTS IN 3 PEAK CHARACTER REGISTER | LOGICALLY AND FIRST LOGIC RESULTS WITH CONTENTS OF 3 PEAK ELIMINATOR REGISTER ASSOCIATED WITH THIRD MOST NEGATIVE PEAK TO PROVIDE FOURTH LOGIC RESULTS IN 3 PEAK CHARACTER REGISTER |

↓ ↓

CHARACTER RECOGNITION SYSTEM

BACKGROUND OF THE INVENTION

The present invention relates to character recognition and, more particularly, to recognition of strings of characters formed with magnetic material in selected geometries on substrates.

Storage of information in one magnetic material based form or another for a subsequent retrieval has become commonplace. In one form, characters with assigned meanings are provided on a nonmagnetic substrate through being formed with magnetizable material thereon in such a manner that they can be recognized both visually and by the resulting characteristic magnetic field distribution patterns they exhibit after magnetization. For example, negotiable bank checks are a common means used in payment processes to provide payment to businesses in exchange for goods and services provided thereby. Such businesses in many situations would like to identify by use of an automatic machine the drawer and the drawer's bank account on which such a check is drawn as means for reviewing any past transactions with the drawer, other's experiences in dealing with the drawer, and account funding. Such information provides a rational basis for determining whether the check in question should be accepted by the business in payment for whatever goods or services are to be provided.

Though such bank checks may vary in size and style, each is typically printed with a series of standardized characters using ink containing magnetizable particles. Such characters then offer the possibility of being recognized automatically by machine after magnetizing these particles thereon through sensing the peculiar magnetic field distributions emanating therefrom due to the particular presences and absences of the magnetizable particles over the area associated with each character.

Over the years, many machine systems have been developed for the purpose of magnetic ink character recognition (MICR) to automate the sensing and identification of such standardized character strings on bank checks. A typical MICR system recognizes the magnetic ink characters on the bank check by passing it by a sensor and deriving a sensor output waveform representing the rates of change of the magnetic fluxes emanating from the character magnetizable particles, as each is peculiarly distributed over the area associated therewith, to distinguish one from another. Because the areal distribution of the magnetic ink associated with each character is unique as formed over a standard $8 \times 9$ cell matrix containing cells of standard area and form, the waveform derived for each standard character, so defined, after sensing is unique and substantially repeatable.

The accuracy of any particular recognition system turns, first, on the reliability, preservability and accuracy of the printing of the magnetic ink characters on bank checks or other substrates of interest. The accuracy then further depends on the reliability, accuracy and tolerance for degradation and noise in the recognition system in its sensing of changes in the magnetic fluxes of characters moving past the system magnetic field sensor and the subsequent matching of the resulting waveforms with criteria established therein to provide a signal representation for the corresponding character.

Prior art machine recognition systems have addressed the recognition of magnetic ink characters through various methods of converting the waveforms, resulting from detecting the flux changes due to the moving magnetized particles in the ink of a character, to what's desired to be an equivalent digital signal to thereby provide a basis for a recognition process for each character sensed on a bank check. One type of system of this nature, for example, correlates timing pulses with the speed of the movement of the check through the system as found by a mechanically based measurement to represent the timing of magnetic changes indicating the nature and presence of a character. The peak of the signals resulting from such changes must, depending on the polarity thereof, pass beyond corresponding minimum positive and negative thresholds set in the system leading to the pass beyond, and the not pass beyond, results being stored in corresponding positive and negative registers. The outputs of the positive and negative registers are used to ascertain from the waveform character providing it.

Accurate assembling of this peak information for each character based on its magnetic flux change waveform is a problem due to the presence of "noise," i.e. primarily imperfections in the magnetic material of the characters on the bank checks in most circumstances. Imperfections in the magnetic materials due to creases in the paper and bald spots due to misprinting, and to wear in handling, distort the waveform for the affected character. A complex waveform classification scheme such as that just described, employing information as to both positive and negative peaks either passing beyond the corresponding thresholds or not in output waveform from the character sensing, is used by the system to reduce the effect of such noise on the recognition process. This information is matched in the system against characteristic positive and negative peak patterns expected in the waveforms of each character as the basis for several matchings to thereby reduce the likelihood of error in selecting a character to be represented as being like the one providing the waveform.

One problem with such a system is that the limited character quality tolerances of such a scheme can require the setting of the threshold levels for the peaks so that increased accuracy can be obtained only at the expense of an increased rejection rate. Thus, a recognition system that maintains a high degree of accuracy while permitting a relatively high level of noise in the waveforms sensed from passing standardized MICR characters on bank checks or other substrates of interest is desired.

SUMMARY OF THE INVENTION

The present invention is for acquiring signal representations intended to correspond with those character representations, out of a set of possible character representations, provided on a nonmagnetic material substrate so as to be capable of establishing corresponding magnetic fields. The substrate is moved past a magnetic field sensor to provide a measured character waveform in a character waveform time interval, and subintervals of that interval are identified having extrema of the measured character waveform located therein and ordered based on extrema values. The subintervals indicated by the extrema of expected character waveforms associated with possible character representations are ordered by the extrema thereof, and the ordering of these subintervals of the expected character waveform time interval are compared to the ordering of those in the character waveform time interval of the measured character waveform ordered by the extrema thereof. Character representations having expected character waveforms with subintervals in their character waveform time intervals differently ordered than those associated with the measured waveform are eliminated until a character representation is selected likely to match that imprinted on the substrate giving rise to the measured character waveform. The likelihood of a proper selection is enhanced by the ordering of the elimination steps, and by the ordering of the symbols for selection ranked by error likelihood. Initial peak thresholds used in establishing the presence of a measured character waveform, and for the duration of such subintervals, and they are updated in accord with character waveform signal strengths and corresponding character waveform time interval durations.

DETAILED DESCRIPTION OF THE PREFERRED EMBODIMENTS

Figure 1:
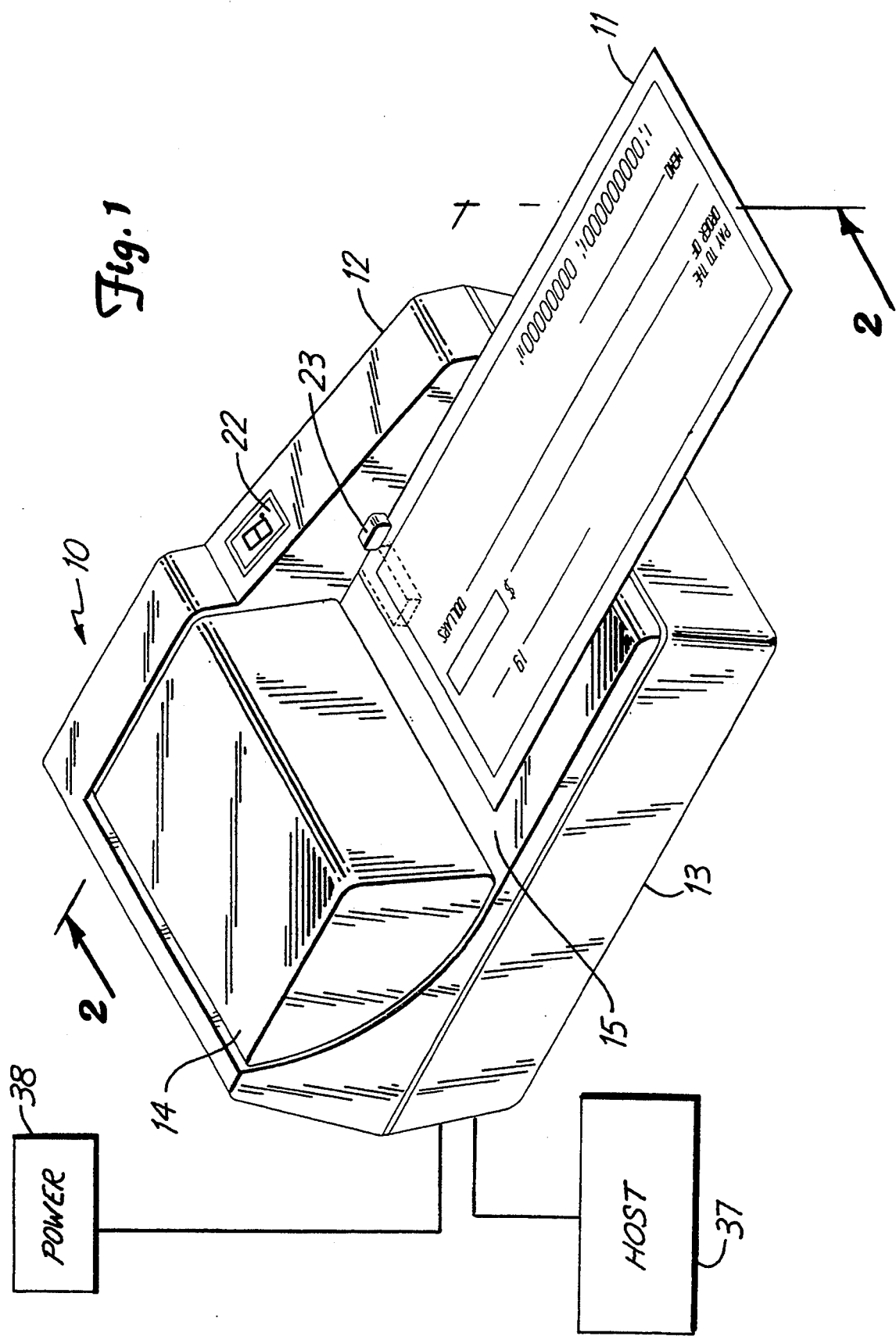
FIG. 1 shows a pictorial view of a device embodying the present invention.

FIG. 1 shows a pictorial view of the character converting or recognizing device, 10, of the present invention. Device 10 is used to acquire signal representations for character representations intended to match those formed by magnetizable material structures provided on a nonmagnetic material substrate such as a bank check, 11. Device 10 is shown in FIG. 1 having a transfer bed and display structure, 12, and a base structure, 13. A cap structure, 14, is shown above a portion of a transfer bed, 15, in transfer and display structure 12.

Figure 2:
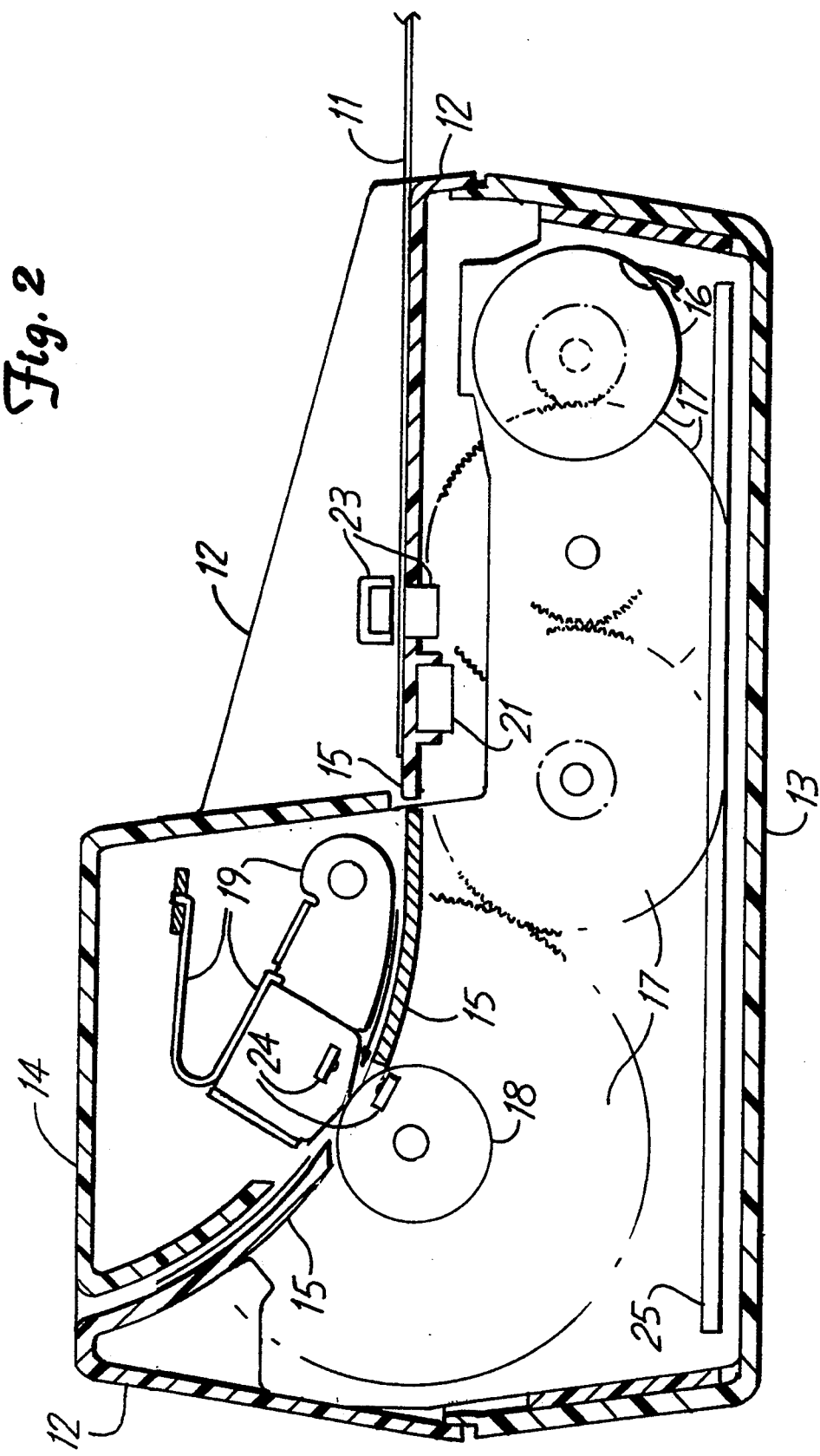
FIG. 2 shows a cross section view taken from the device shown in FIG. 1.

FIG. 2 shows a cross section view taken from device 10 of FIG. 1 which more or less follows the section lines suggested by that cross section view indicated by numerals "2" in FIG. 1. A drive motor, 16, is selectively operated to drive a gear reduction train, 17, to selectively rotate a pinch roller, 18. Opposite pinch roller 18 is a spring, 19, holding a magnetic sensor, 20, against pinch roller 18. Magnetic sensor 20 is an inductive sensor capable of sensing changes in magnetic flux occurring in the region sufficiently close to pinch roller 18. Such magnetic flux changes to be sensed occur because of the movement of bank check 11 past the sensor with appropriately selected magnetizable material character structures present on the paper surface thereof in various geometrical distributions, depending on the character being represented, that are typically provided there by imprinting with ink containing such particles therein. That magnetizable material in the character structures on check 11 is magnetized by a permanent magnet, 21, shown in FIG. 2 (indicated by dashed lines in FIG. 1) prior to this check being moved past magnetic sensor 20.

Such movement of bank check 11 with the magnetizable material character structures thereon is initiated by manually placing bank check 11 on transfer bed 15 against the raised portion of bed and display structure 12 having a character display, 22, therein which forms a sidewall along bed 15. As bank check 11 is manually advanced along the upper surface of transfer bed 15 with the long side thereof positioned against the sidewall formed by the display structure portion of structure 12, the leading edge of check 11 first encounters a transmissive path edge sensor, 23, comprising a light emitting device and a light detecting device on opposite sides of the plane formed by the surface of transfer bed 15. In the absence of bank check 11, the light path between this light emitter and this light detector is unobstructed so that light propagating therealong from the emitter is transferred to the detector continuously. Bank check 11 interrupts this light path blocking such propagation to thereby cause path edge sensor 23 to indicate the presence of, first, the leading edge of bank check 11, and then the long edge thereof against the display sidewall, as they pass across this light path at the location of that sensor.

Continued manual advancement of bank check 11 brings the leading edge of that check to a transmissive leading edge sensor, 24, again having a light emitting portion on one side of the plane of the surface of transfer bed 15 (although "curved upper surface" instead of "plane" at this location would be more accurate) and a light detecting element on the other so that light can be propagated over the light path therebetween. As the leading edge of bank check 11 interrupts the propagation of light over the light path in leading edge sensor 24, and as the long edge of bank check 11 continues to interrupt the transfer of light over the light path in path edge sensor 23, together for a sufficient amount of time, motor 16 is operated to rotate pinch roller 18 in a counterclockwise direction to engage the leading edge of check 11 and force it past magnetic sensor 20 and over the rest of the upper surface of transfer bed 15.

During this transfer, magnetic sensor 20 senses the fluxes of the magnetic fields emanating from the magnetized material structures forming each corresponding character representation on bank check 11 and provides, as its output signal, the resulting character waveform extending over a corresponding character waveform time interval to the signal processing electronic circuits contained in a circuit board structure, 25.

Figure 3:
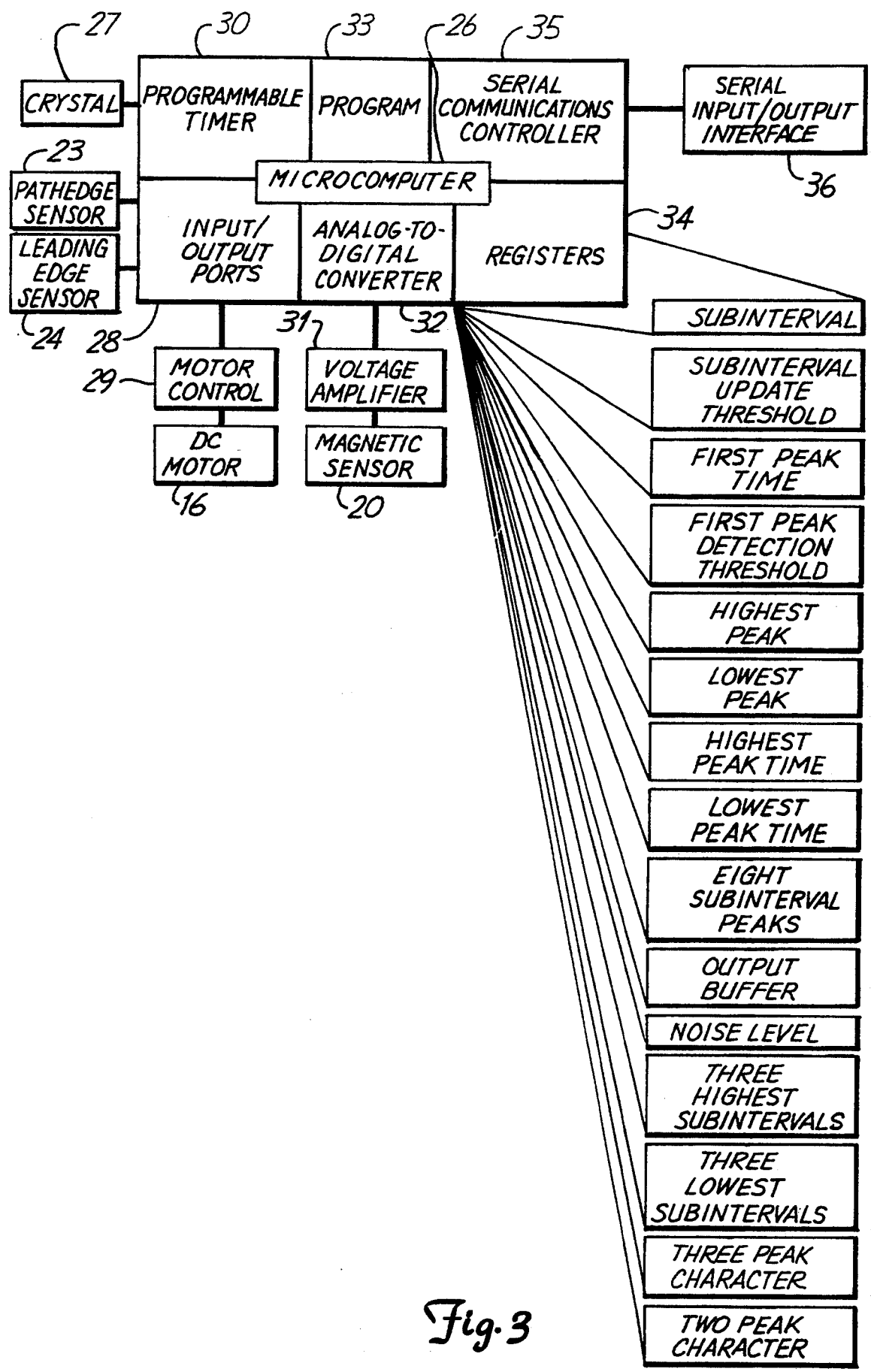
FIG. 3 shows a system block diagram for the system contained in the device of FIG. 1.

A highly schematized block diagram is shown in FIG. 3 for the motor, sensors, and electronic circuitry for device 10. A microcomputer, 26, typically having eight bit data and address busses, and operated at a clock frequency of 4 Mhz set by a crystal, 27, is used to manage operation of device 10. Microcomputer 26 has a portion thereof forming input and output ports, 28, which are electrically connected with a motor controller, 29, used to operate motor 16, typically a direct current motor. Ports 28 are also electrically connected with path edge sensor 23 and leading edge sensor 24. Crystal 27, providing the baseline clock for operating microcomputer 26, is shown connected with a programmable timer portion, 30, in microcomputer 26.

The character waveforms measured by magnetic sensor 20 are provided to a voltage amplifier, 31, which supplies the amplified voltage signal to an analog-to-digital converter, 32, which provides a digitized version of the character waveforms for signal processing in microcomputer 26. Such signal processing is carried out in accord with a program section, 33, in microcomputer 26 in conjunction with various signal processing sections of microcomputer 26 including a number of memory registers, 34.

Finally, there is a serial communications portion, 35, of microcomputer 26 electrically connected to a serial input/output interface, 36. Interface 36 is typically connected to a host computer for communication therebetween, as is shown in FIG. 1 in a block, 37, labeled "HOST" in FIG. 1. In addition, in FIG. 1, an electrical power connection is shown made to device 10 from a source of electrical power, 38.

A typical output signal waveform derived by magnetic sensor 20 from a character representation, formed by a magnetizable material structure imprinted on paper bank check 11, passing by that sensor on transfer bed 15 in device 10, or measured character waveform, has extrema, or peaks therein, occurring at varying points during the character waveform time interval over which it extends. Such a measured character waveform has these extrema at points therein of varying polarities and varying peak amplitude values depending on the particular character passing by sensor 20. For such character representations on check 11 that are also consistent with well known standard character designs, the locations of these time points in the character waveform time interval, and the amplitudes for each such peak, have expected values for a given check speed of passage which are quite repeatable in the absence of degradation in either the characters as provided on check 11 or in the sensing system.

Figure 4:
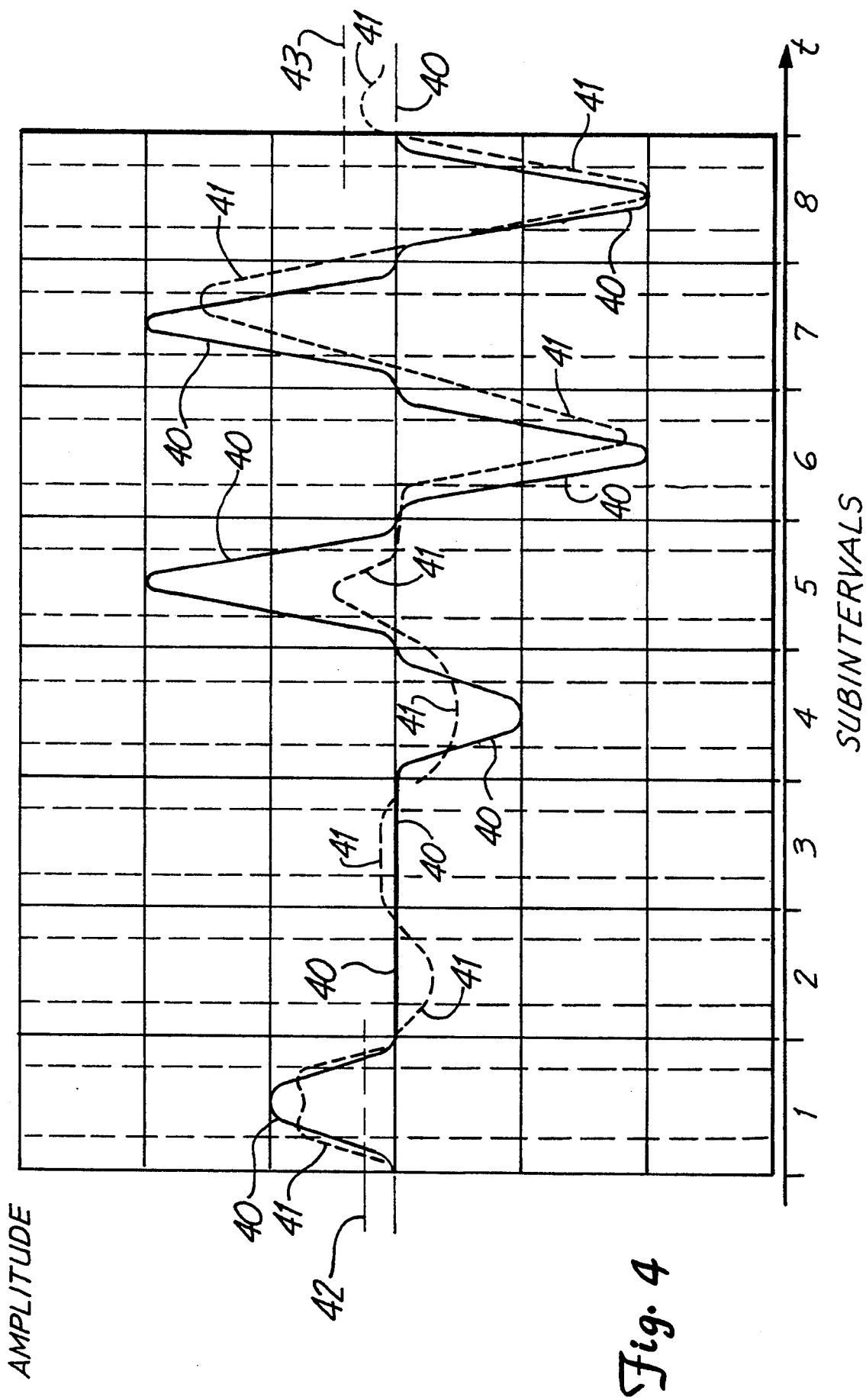
FIG. 4 is a graph of signals occurring in the system of FIG. 3.

FIG. 4 shows such an expected character waveform, 40, presented as a solid line plotted against time in that figure for an arbitrarily chosen example character representation on check 11. The example chosen is termed the "on us" character from the set of standard characters used for imprinting checks that are to be machine recognized. However, the expected character waveform for a particular character from this set often does not match the actual waveform measured for such a character passing by magnetic sensor 20 because of the absence of some magnetizable particles due to misprinting in some locations or wearing away during handling in some locations, or to creases in the check paper passing through a character, etc. Thus, a typical measured waveform, 41, is also plotted against time in FIG. 4.

The various degradations of imprinted character representations are most likely to be ones leading to missing portions of the magnetizable particles intended to be in a character structure, and so lead to measured character waveforms usually having peaks with amplitude values reduced from those expected. This can be seen in the differences between waveforms 40 and 41 in FIG. 4. In some locations where the expected waveform has a relatively low magnitude, there may be some measured waveform peaks, either negative or positive, which have larger or smaller values than the expected waveform due to some forms of imprinted character degradation such as paper creases thereunder.

Further, the expected waveform of a character is attained for a constant speed of check 11 passing magnetic sensor 20, a situation which in actual practice is not always attained so that the measured waveform peaks may shift in time a bit from the expected character waveform peak locations. Since the characteristic extrema in the measured waveforms for each imprinted character are the basis of distinguishing which character in the standard set provided the measured waveform, such variations can lead to errors in selecting a signal representation indicating a character as matching that one on check 11 having provided a certain measured character waveform. Hence, recognition system 10 must use algorithms for selection of those characters from the standard set thereof as matching those giving rise to measured character waveforms which tolerate such differences between expected character waveforms and measured character waveforms. This is necessary if the proper signal representation for a character is to be sent to the system Output Buffer Register as being the one which caused the corresponding measured character waveform to issue from sensor 20.

The standardized designs to be imprinted on checks for each character from the set of standard characters to be machine recognized on bank checks naturally leads to eight time subintervals during a character waveform time interval in which the various extrema or peaks, either positive or negative, are expected to occur. Thus, there are eight numbered subintervals shown in the plot of FIG. 4, and they are shown there to be substantially equal in duration to one another which is how they are designed to be in the set of standard characters referred to above. Note that the plot also provides vertical dashed lines indicating the quarter and three-quarter locations in each such subinterval.

In device 10, the three subintervals in each character waveform time interval containing the greatest value positive extrema, or maxima, of the corresponding measured character waveform and the three subintervals having the least negative value extrema, or minima, of that waveform are first found for each measured character waveform. A character is selected by devise 10 as matching that one imprinted on bank check 11 giving rise to the measured character waveform through a process of systematically eliminating characters from the set of standard characters which is the set of possible characters if the imprinted bank checks follow the standards for machine recognition. Those eliminated have expected character waveforms with the relatively larger maxima and the relatively smaller minima therein located in subintervals of their character waveform time intervals differing from the subintervals in which the measured character waveform has its relatively larger maxima and relatively smaller minima occur. The character remaining based on its expected character waveform, after this eliminating of other possible characters based on their expected character waveforms, will presumably have its corresponding relatively larger maxima and relatively smaller minima in subintervals corresponding to those in the character waveform time interval of the measured character waveform containing similar extrema. Thus, this remaining character from the set of possible characters is selected as the character matching that imprinted on the check giving rise to the measured character waveform. In some instances, the measured character waveform will be sufficiently degraded so as to result in more than one possible character remaining and then an additional selection criterion is used based on the likely reduction of error in making the selection.

Since deviations in the measured character waveform from those in the corresponding expected character waveform will very likely represent diminutions in the absolute value of the extrema with respect to the zero reference value of the waveforms, as described above, the elimination process can be designed to reduce selection error making use of this characteristic of measured character waveforms. Thus, the elimination process is begun by use of the subinterval of its character waveform time interval containing the measured character waveform positive extremum, i.e. containing the greatest maximum, or by use of the subinterval of its character waveform time interval containing the measured character waveform negative extremum, i.e. containing the least minimum, to be matched for consistency against the subinterval of the expected character waveforms of the standard set of characters containing a similar extremum. Such an initial step in the elimination process is likely to have the least chance of error in eliminating expected character waveforms incompatible with the measured character waveform since the greatest value extremum of measured character waveform of either one polarity or the other are least likely to have suffered serious degradation.

Thus, for example, the subinterval of the character waveform time interval for a measured character waveform having the greatest positive peak is used first to eliminate from the set of possible characters those with expected character waveforms which do not have the greatest positive peak thereof in the same corresponding subinterval of the expected character waveform time interval. After that elimination decision, a second subinterval of the character waveform time interval for a measured character waveform having the next greatest positive peak is used to eliminate from the remaining possible characters those which have expected character waveforms incompatible with the second greatest positive peak thereof being in the corresponding subinterval of its expected character waveform time interval. This process of elimination decisions based on peaks in subintervals is continued using another positive peak subinterval and the subintervals of the least value negative peaks of the measured character waveform until the elimination process is carried through the three greatest positive measured character waveform peaks subintervals and the three least minimum measured character waveform peaks.

In addition, a further feature of the standardized character designs of the set of standard characters can be used. This feature is that the standard set of characters can be divided into two groups, one of which has associated expected character waveforms that clearly have three greatest positive peaks or three least negative peaks therein (for example, these peaks being merely beyond some appropriate positive and negative threshold levels, respectively) or both, and the other which has associated expected character waveforms that clearly have no more than two greatest positive peaks and two least negative peaks. The elimination process for each measured character waveform is performed separately by device 10 for the three peak group of possible characters based on six peak subinterval elimination decisions to take advantage of the extra pair of peaks over those present in the two peak group in providing additional information to better assure reliable peak subinterval elimination decisions. The elimination process is also done separately for characters in the two peak group of possible characters but making only four peak subinterval elimination decisions for each measured character waveform. If there is a difficulty in the elimination process leaving doubt as to whether a character should be selected from either the three peak group or the two peak group, the character will be taken from the two peak group since this situation strongly suggests that the third peak giving rise to the character being compatible with the three peak group of characters is due to unwanted noise peak.

This elimination process is implemented by forming a pair of matrices for each group, the three peak group of possible characters having a three positive peak matrix and a three negative peak matrix, and the two peak group of possible characters having a two positive peak matrix and a two negative peak matrix as follows:

3 Positive Peak Matrix

| | ? | — | A | $ | 9 | 8 | 6 | 7 |
|---|---|---|---|---|---|---|---|---|
| 8 | 0 | 0 | 0 | 0 | 0 | 0 | 0 | 0 |
| 7 | 0 | 0 | 1 | 0 | 0 | 0 | 0 | 0 |
| 6 | 0 | 1 | 0 | 1 | 1 | 1 | 1 | 0 |
| 5 | 0 | 0 | 1 | 0 | 0 | 0 | 0 | 1 |
| 4 | 0 | 0 | 0 | 1 | 0 | 0 | 0 | 0 |
| 3 | 0 | 1 | 0 | 0 | 0 | 0 | 1 | 1 |
| 2 | 0 | 0 | 0 | 0 | 0 | 1 | 0 | 0 |
| 1 | 0 | 1 | 1 | 1 | 1 | 1 | 1 | 1 |

2 Positive Peak Matrix

| | T | 5 | 4 | 3 | 2 | 1 | 0 | Sp |
|---|---|---|---|---|---|---|---|---|
| 8 | 0 | 0 | 0 | 0 | 0 | 0 | 0 | 0 |
| 7 | 0 | 0 | 0 | 0 | 0 | 0 | 1 | 0 |
| 6 | 1 | 0 | 0 | 0 | 0 | 0 | 0 | 0 |
| 5 | 0 | 1 | 1 | 0 | 0 | 0 | 0 | 0 |
| 4 | 0 | 0 | 0 | 0 | 1 | 0 | 0 | 0 |
| 3 | 0 | 0 | 0 | 0 | 0 | 1 | 0 | 0 |
| 2 | 0 | 0 | 0 | 1 | 0 | 0 | 0 | 0 |
| 1 | 1 | 1 | 1 | 1 | 1 | 1 | 1 | 0 |

3 Negative Peak Matrix

| | ? | — | A | $ | 9 | 8 | 6 | 7 |
|---|---|---|---|---|---|---|---|---|
| 8 | 0 | 1 | 1 | 1 | 0 | 1 | 0 | 0 |
| 7 | 0 | 0 | 0 | 0 | 1 | 1 | 1 | 0 |
| 6 | 0 | 0 | 1 | 0 | 0 | 0 | 0 | 1 |
| 5 | 0 | 1 | 0 | 1 | 0 | 0 | 0 | 0 |
| 4 | 0 | 0 | 1 | 0 | 0 | 0 | 1 | 1 |
| 3 | 0 | 0 | 0 | 1 | 1 | 1 | 0 | 0 |
| 2 | 0 | 1 | 0 | 0 | 1 | 0 | 1 | 1 |
| 1 | 0 | 0 | 0 | 0 | 0 | 0 | 0 | 0 |

2 Negative Peak Matrix

| | T | 5 | 4 | 3 | 2 | 1 | 0 | Sp |
|---|---|---|---|---|---|---|---|---|
| 8 | 1 | 0 | 0 | 0 | 0 | 0 | 1 | 0 |
| 7 | 0 | 0 | 1 | 0 | 0 | 0 | 0 | 0 |
| 6 | 0 | 1 | 0 | 1 | 0 | 0 | 0 | 0 |
| 5 | 0 | 0 | 0 | 0 | 1 | 1 | 0 | 0 |
| 4 | 1 | 0 | 0 | 0 | 0 | 1 | 0 | 0 |
| 3 | 0 | 0 | 1 | 1 | 0 | 0 | 0 | 0 |
| 2 | 0 | 1 | 0 | 0 | 1 | 0 | 1 | 0 |
| 1 | 0 | 0 | 0 | 0 | 0 | 0 | 0 | 0 |

These matrices in each group of possible characters have the columns thereof corresponding to those of the set of standard characters in that group as shown by the character symbols across the top of each column. The symbol "?" represents an error in recognition. The symbol "—" represents the "dash" character. The symbol "A" represents the "on us" character. The symbol "$" represents the "amount" character. The symbol "T" represents the "transit" character. The symbol "Sp" represents a space between characters. The number symbols represent the corresponding number characters. The rows of the matrices correspond to subintervals in the expected character waveform time interval of the expected character waveform for each character as shown by the subinterval numbers on the left of each row. These matrices are filled in using logical ones and logical zeros.

For each character other than a space or an error, a logical one appears in those subinterval entries under its symbol in which it has one of its three most positive peaks (if it has three) in the three positive peak matrix, or in which it has its two most positive peaks in the two positive peak matrix. The remaining subinterval entries thereunder have logical zeros appearing therein. Similarly, the three negative peak matrix has logical ones appearing in those subinterval entries under a character symbol other than a space or an error in which it has one of its three least minima peaks or three most negative peaks (if it has three), and logical zeros in the other subinterval entries thereunder. A similar set of entries is made in the two negative peak matrix for the two most negative peaks under a character symbol. These matrices are stored in permanent memory in device 10.

The characters are ordered across the columns of these matrices by the likelihood of that character giving rise to an error in the recognition process by device 10 in providing a signal representation corresponding to that one of the set of standardized characters selected as matching that on bank check 11 giving rise to the measured character waveform. As a result, if there is doubt between selecting one of two characters in the same group, the character above a column further to the right in the group will be selected over one further to the left on the basis that a greater likelihood of error makes it the one more likely to have been used on the check giving rise to an ambiguous character waveform leading to the selection doubt.

An example of the use of these matrices in the elimination process in device 10 is provided by using the measured character waveform from FIG. 4. This waveform leads to the following Eight Subinterval Peaks Register contents in device 10, and so to the results listed thereafter as to the subintervals contained in the Three Highest Subintervals Register (the three subintervals having the three greatest maxima of the FIG. 4 measured character waveform contained therein) and the Three Lowest Subintervals Register (the three subintervals having the three least minima of the FIG. 4 measured character waveform contained therein):

Eight Subinterval Peaks Register

| +50 | −20 | +15 | −25 | +30 | −90 | +100 | −100 |
|---|---|---|---|---|---|---|---|
| 1 | 2 | 3 | 4 | 5 | 6 | 7 | 8 |

Subinterval

First most positive peak subinterval = 7
Second most positive peak subinterval = 1
Third most positive peak subinterval = 5

First most negative peak subinterval = 8
Second most negative peak subinterval = 6
Third most negative peak subinterval = 4

A Three (3) Peak Character Register with each digit therein representing one of the characters in the three peak group, in the same order as the characters are represented by the columns in the three positive and negative peak matrices, is set to have a logical one in each digit position. The contents of the row in the three positive peak matrix, termed a bit mask in the illustration, representing the subinterval having the first most positive peak, subinterval seven, for the measured character waveform are then logically "ANDed" with the contents of the Three Peak Character Register. The resulting zeros in the Three Peak Character Register are in columns under what have become eliminated possible characters due those characters not having expected character waveforms with peaks in subintervals seven of the corresponding expected character waveform time intervals. Then these results are logically "ANDed" with the row in the three positive peak matrix representing the subinterval having the next most positive peak in the measured character waveform, subinterval one. This process continues for the remainder of the three group peak subinterval elimination decisions in the order shown in the illustration below:

| Character correspondence | ? | − | A | $ | 9 | 8 | 6 | 7 |
|---|---|---|---|---|---|---|---|---|
| Initial state of 3 Peak Character Register | 1 | 1 | 1 | 1 | 1 | 1 | 1 | 1 |
| 1st positive peak | | | | | | | | |
| subinterval 7 bit mask | 0 | 0 | 1 | 0 | 0 | 0 | 0 | 0 |
| result of bitwise AND | 0 | 0 | 1 | 0 | 0 | 0 | 0 | 0 |
| 2nd positive peak | | | | | | | | |
| subinterval 1 bit mask | 0 | 1 | 1 | 1 | 1 | 1 | 1 | 1 |
| result of bitwise AND | 0 | 0 | 1 | 0 | 0 | 0 | 0 | 0 |
| 1st negative peak | | | | | | | | |
| subinterval 8 bit mask | 0 | 1 | 1 | 1 | 0 | 1 | 0 | 0 |
| result of bitwise AND | 0 | 0 | 1 | 0 | 0 | 0 | 0 | 0 |
| 2nd negative peak | | | | | | | | |
| subinterval 6 bit mask | 0 | 0 | 1 | 0 | 0 | 0 | 0 | 1 |
| result of bitwise AND | 0 | 0 | 1 | 0 | 0 | 0 | 0 | 0 |
| 3rd positive peak | | | | | | | | |
| subinterval 5 bit mask | 0 | 0 | 1 | 0 | 0 | 0 | 0 | 1 |
| result of bitwise AND | 0 | 0 | 1 | 0 | 0 | 0 | 0 | 0 |
| 3rd negative peak | | | | | | | | |
| subinterval 4 bit mask | 0 | 0 | 1 | 0 | 0 | 0 | 1 | 1 |
| result of bitwise AND | 0 | 0 | 1 | 0 | 0 | 0 | 0 | 0 |
| Results in 3 Peak Register | 0 | 0 | 1 | 0 | 0 | 0 | 0 | 0 |

The result in the Three Peak Character Register at the end of this elimination process is out above with there being a single digit position having a one therein representing a possible character which still could be selected. The remaining digit positions have zeros indicating the possible characters at the heads of the corresponding column have been eliminated from being selected.

The elimination process for the two peak group is then undertaken with again each digit position in a Two (2) Peak Character Register having a logic one therein. Once again, the digit positions in this register are ordered in the same way as the columns of the two peak positive and negative matrices. Again, the bit mask corresponding to subinterval 7 from the two positive peak matrix, as the one containing the most positive peak in the character waveform time interval for the measured character waveform, is logically "ANDed" with the contents of the Two Peak Character Register. This result in the Two Peak Character Registers then logically "ANDed" with the bit mask from subinterval 8 of the two negative peak matrix, and so on in the order shown in the illustration below:

| Character correspondence | T | 5 | 4 | 3 | 2 | 1 | 0 | Sp |
|---|---|---|---|---|---|---|---|---|
| Initial state of 2 Peak Character Register | 1 | 1 | 1 | 1 | 1 | 1 | 1 | 1 |
| 1st positive peak | | | | | | | | |
| subinterval 7 bit mask | 0 | 0 | 0 | 0 | 0 | 0 | 1 | 0 |
| result of bitwise AND | 0 | 0 | 0 | 0 | 0 | 0 | 1 | 0 |
| 1st negative peak | | | | | | | | |
| subinterval 8 bit mask | 1 | 0 | 0 | 0 | 0 | 0 | 1 | 0 |
| result of bitwise AND | 0 | 0 | 0 | 0 | 0 | 0 | 1 | 0 |
| 2nd positive peak | | | | | | | | |
| subinterval 1 bit mask | 1 | 1 | 1 | 1 | 1 | 1 | 1 | 0 |
| result of bitwise AND | 0 | 0 | 0 | 0 | 0 | 0 | 1 | 0 |
| 2nd negative peak | | | | | | | | |
| subinterval 6 bit mask | 0 | 1 | 0 | 1 | 0 | 0 | 0 | 0 |
| result of bitwise AND | 0 | 0 | 0 | 0 | 0 | 0 | 0 | 0 |
| Results in 2 Peak Register | 0 | 0 | 0 | 0 | 0 | 0 | 0 | 0 |

As can be seen, there are no ones in the Two Peak Character Register at the end of this elimination process but only zeros so that all the possible characters at the heads of the columns thereabove have been eliminated from being selected. Thus, the only bit left in the Three and Two Peak Character Registers is the bit in the Three Peak Character Register designating the "A" or the "on us" symbol as the one to be selected as matching the symbol on bank check 11 giving rise to the measured character waveform shown in FIG. 4.

FIG. 4 illustrates a further measure taken in device 10 to counteract differences in the printing processes used in imprinting different checks, the differing wear characteristics of different checks, electronics aging, etc. An output signal from magnetic sensor 20 is not accepted as the start of a measured character waveform unless the initial positive pulse exceeds a threshold, 42, for a selected period of time. Each standardized design character in the set of standard characters used in imprinting checks for machine recognition will provide a peaked positive pulse in the first subinterval of its character waveform time interval, and this pulse exceeding the threshold for a sufficient time is the basis for accepting an output signal as a character waveform rather than some noise impulse as stated.

However, because of the differences in printing, wear, aging electronics and the like, that threshold cannot be chosen to be a permanent fixed value without comprising its usefulness in ascertaining that an acceptable magnetizable material character structure is passing by magnetic sensor 20. Thus, a value is obtained from permanent memory for an initial first peak threshold at the start of a character recognition process in connection with bank check 11, but that value is updated to provide a current first peak threshold value during at least part of remaining portions of that recognition process. To this end, device 10 keeps in permanent memory amplitude values of peaks in expected character waveforms, and uses differences between the amplitude of the greatest positive peak of an expected character waveform and that in a measured character waveform to correspondingly adjust the first peak threshold value. Hence, a different current first peak threshold value, 43, is shown at the end of the character waveform in FIG. 4 from that threshold value 42 present at the beginning of that character waveform.

A further consideration is the speed of bank check 11 in moving past magnetic sensor 20. Such speed can vary with varying conditions on the surfaces of bank checks and on the changing surface of pinch roller 18 over time. In addition, motor 16 will have some variation in its angular rate of rotation. These effects can lead to differing speeds for bank checks in moving past magnetic sensor 20 which then affects the duration of the character waveform time intervals for each measured character waveform. As a result, the durations of the eight subintervals of each character waveform time interval must accordingly be updated to substantially divide the character waveform time interval into eight substantially equal subintervals if positive and negative extrema of the measured character waveform are to be kept in the same subintervals in which they would appear in the corresponding expected character waveform associated with the standardized design characters in the standard set of characters used to imprint checks for machine recognition.

An initial subinterval duration is obtained from permanent memory based on the expected value therefor given the speed intended for motor 16. Thereafter, the elapsed times from the first positive peak always occurring in the first subinterval to each succeeding positive peak exceeding a subinterval update threshold is determined as a basis for updating the duration of the next following subinterval. Each such elapsed time is divided by the number of subintervals known for the particular measured waveform and its corresponding character to occur between these two peaks to obtain the new duration for the following subinterval.

Figure 5:
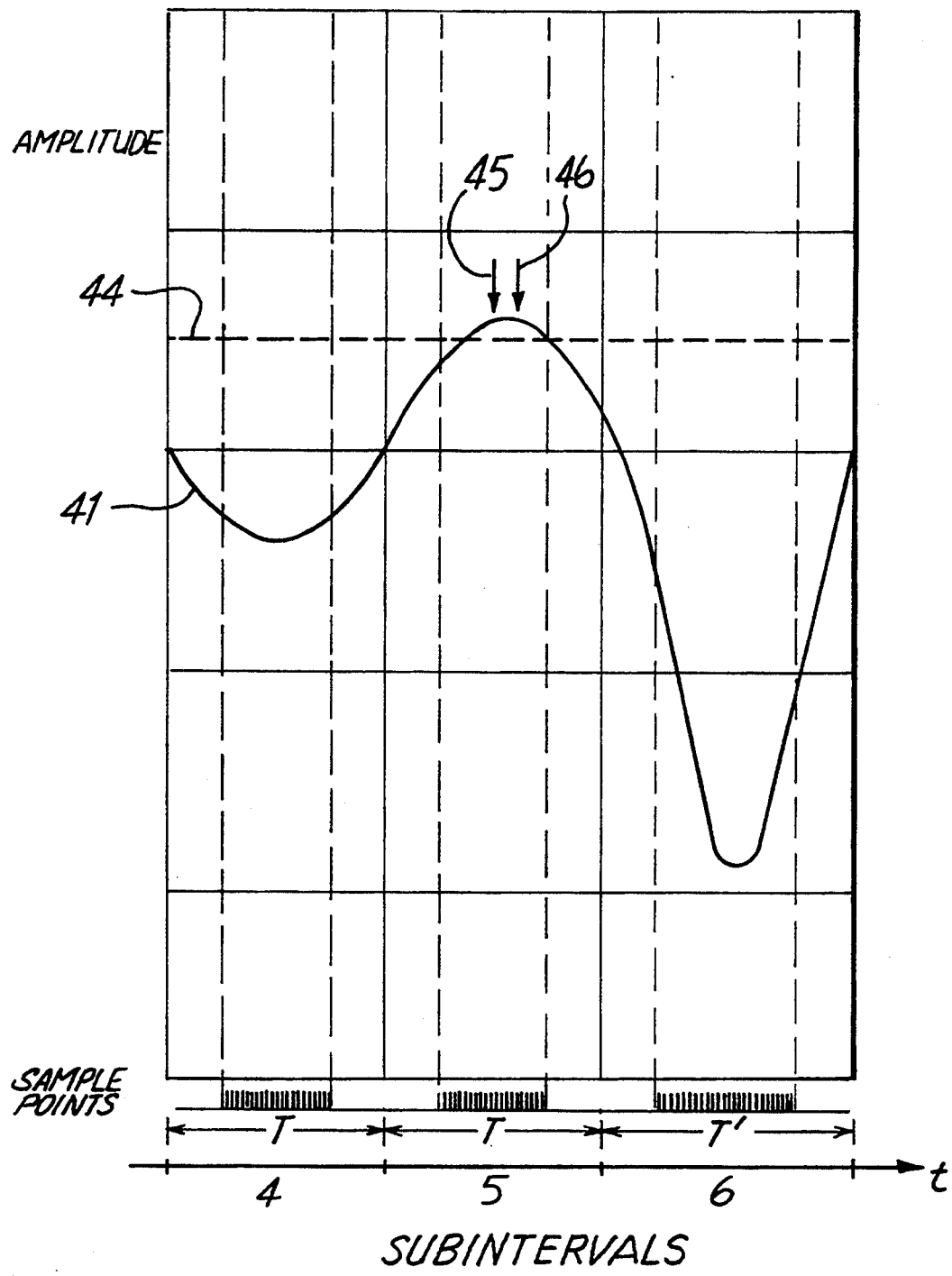
FIG. 5 is a graph of an expanded portion of the graph shown in FIG. 4.

FIG. 4 shows the first positive peak after subinterval 1 is the peak occurring in subinterval 5. FIG. 5 shows that measured character waveform 41 exceeds a subinterval update threshold, 44, in providing an expanded view of subintervals 4, 5 and 6 from FIG. 4. The expected peak is at the middle of subinterval 5 designated by an arrow, 45, based on the current subinterval duration T. However, waveform 41 has an actual peak shown to the right of arrow 45 by a further arrow, 46. As a result, the subinterval duration value is lengthened to a new value T' which is instituted in the next subinterval, or subinterval 6, in FIGS. 4 and 5. As a result, the subinterval durations are kept on the average equal to an eighth of the character waveform time interval as it changes in duration due to changing check speeds.

This timing adjustment has a further benefit because of the way device 10 ascertains the highest and lowest peaks in subintervals. Device 10 accepts as valid peaks only measured character waveform peaks occurring between the first quarter and the fourth quarter of each subinterval, the quarter and three-quarter marks being shown as vertical dashed lines within the subintervals in both FIGS. 4 and 5. This avoids ambiguities as to which subinterval a peak occurs in if there should be noise difficulties near the crossover point between successive subintervals. The search for peaks is accomplished by obtaining samples of the measured character waveform for a character passing magnetic sensor 20 and storing each new extreme positive value and its time, and each new extreme negative value and its time during the time between the first and fourth quarters of a subinterval so that at the end of a subinterval just the extreme positive or negative peak values, and their times of occurrence, remain in the Highest Peak and Lowest Peak registers, and the Highest Peak Time and the Lowest Peak Time Registers, respectively.

This sampling of measured character waveform values is limited to being between the beginning of the second quarter and the end of the third quarter of a subinterval through analog-to-digital converter 32, providing samples at a constant sampling rate, only during that period. Since the samples are provided at a constant rate, typically 30 some samples in that period, the numbers of samples taken can control the length of that period. This sampling count must then be synchronized with the duration of the subinterval so that changes in the subinterval duration will lead to changes in the number of samples provided during the second and third quarters of a subinterval duration.

Analog-to-digital converter 32 provides an eight bit output so that it divides the amplitude range over which it operates into 256 levels. Amplifier 31 amplifies character waveforms from magnetic sensor 20 to provide such waveforms with a proper amplitude for sampling by converter 32. Level 128 at the output of converter 32 is taken as a zero reference value.

Microcomputer 26, in managing operation of device 10, follows a program set out in program section 33 thereof that proceeds generally along the lines of the flow charts in FIGS. 6, 7, 8 and 9. The most important program portions performed by microcomputer 26 for understanding the present invention are set out in these figures, but not all of the functions performed by microcomputer 26 appear therein.

Figure 6:
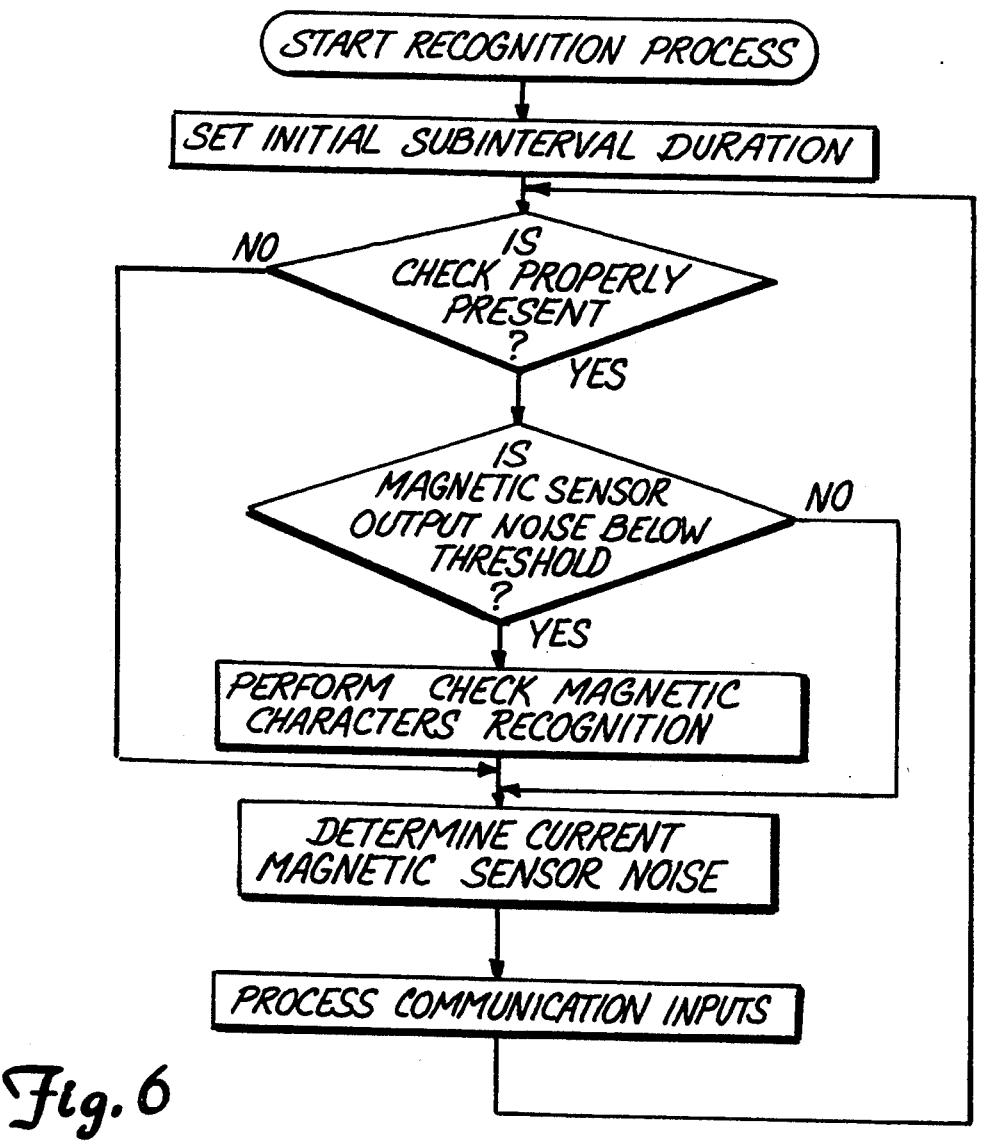
FIG. 6 is a flow chart for the system of FIG. 3, FIGS. 7A and 7B are a flow chart for a block of the flow chart shown in FIG. 6, FIGS. 8A and 8B are a flow chart for a block of the flow chart shown in FIG. 7B, and FIGS. 9A, 9B and 9C are a flow chart for a block of the flow chart shown in FIG. 8B.

The recognition process is started in the flow chart of FIG. 6 by first setting the initial subinterval duration in the Subinterval Register, the value therefor being taken from permanent memory as stated above. Next, the check position is verified, and the magnetic noise environment of magnetic sensor 20 is checked by reference to the Noise Level Register to assure that the magnetic noise level is satisfactory. The recognition process is then entered and performed, as is set out in more detail in the following flow charts, and thereafter the magnetic sensor noise determination is made based on the output signal of sensor 20 and stored in the Noise Level Register for the next review. Finally, communication inputs from host computer system 37 are checked, and this process includes transmitting information recognized on a bank check to host computer 37 for processing there and for providing a response to device 10.

Figure 7A:
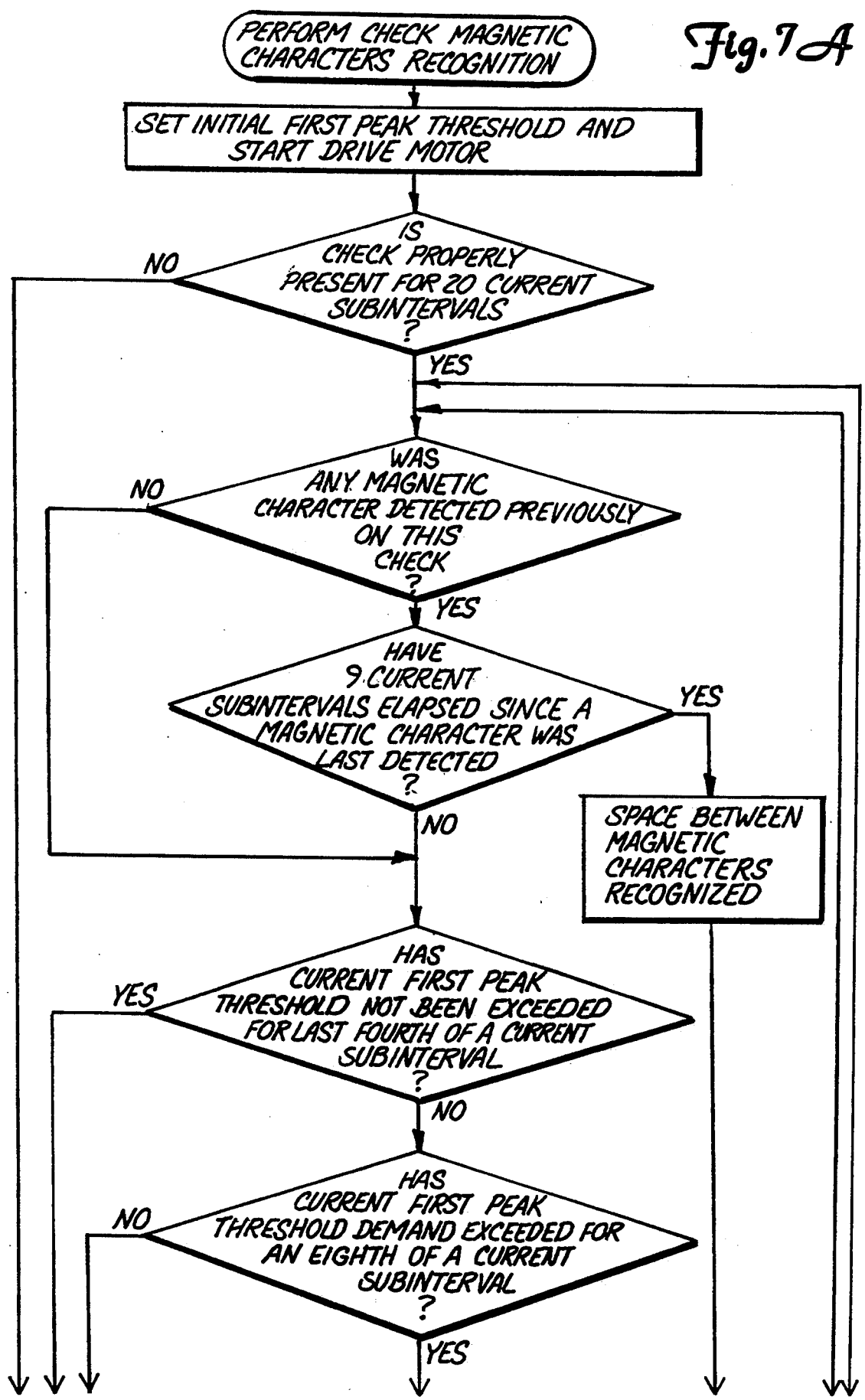
Figure 7B:
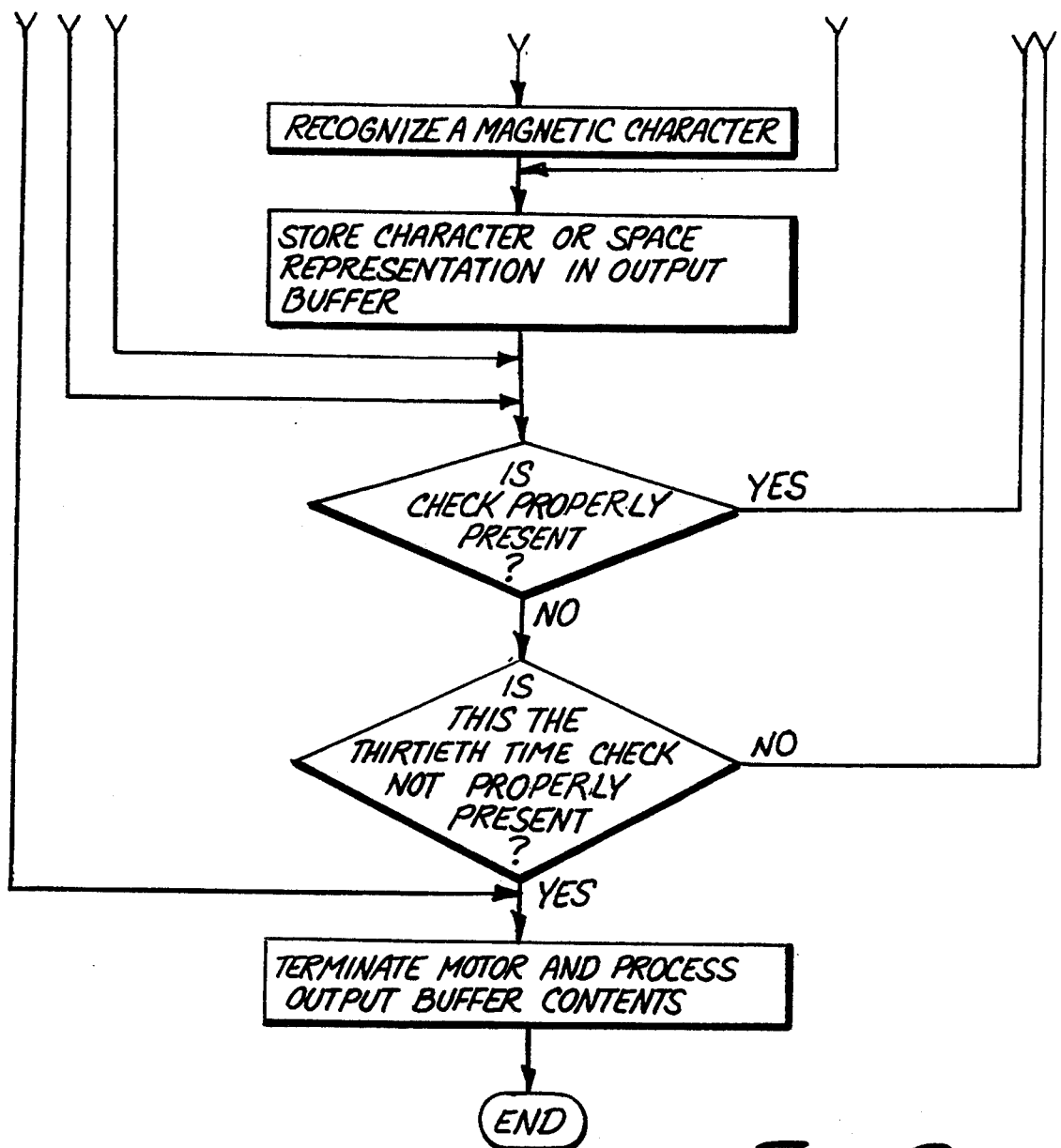

Shown in FIGS. 7A and 7B is the process for recognizing check magnetic characters indicated in the corresponding box shown in FIG. 6. FIG. 7A first shows that the initial first peak threshold is initially set, this setting based on values stored in permanent memory, as stated above, and accomplished in the First Peak Detection Threshold Register. In addition, drive motor 16 is started. The presence of check 11 under the sensors for at least 20 current subintervals is verified as a basis for continuing the recognition process and, if not present, that process is terminated. Next, the issue of whether there has been a space between magnetic characters is determined.

Thereafter, the suitability of a magnetic sensor signal is reviewed to determine whether a first peak in a magnetic character has been properly detected and, if so, the process of recognizing a magnetic character is begun as shown in FIG. 7B with more of the details thereof shown in subsequent flow charts. Otherwise, the cognition process is restarted or terminated. Once done, the character recognized (including the error character if recognition is unsuccessful) or the space representation for a space between characters is stored in the Output Buffer Register. Afterward, there is a determination of whether the process for recognizing a magnetic character should be repeated through reviewing whether the check has been properly positioned or not for a sufficient period of time. When all of the repeats of the recognition process are completed, motor 16 is shut off and the contents of the output buffer are then treated as appropriate with respect to display 22 and host computer 37.

Figure 8A:
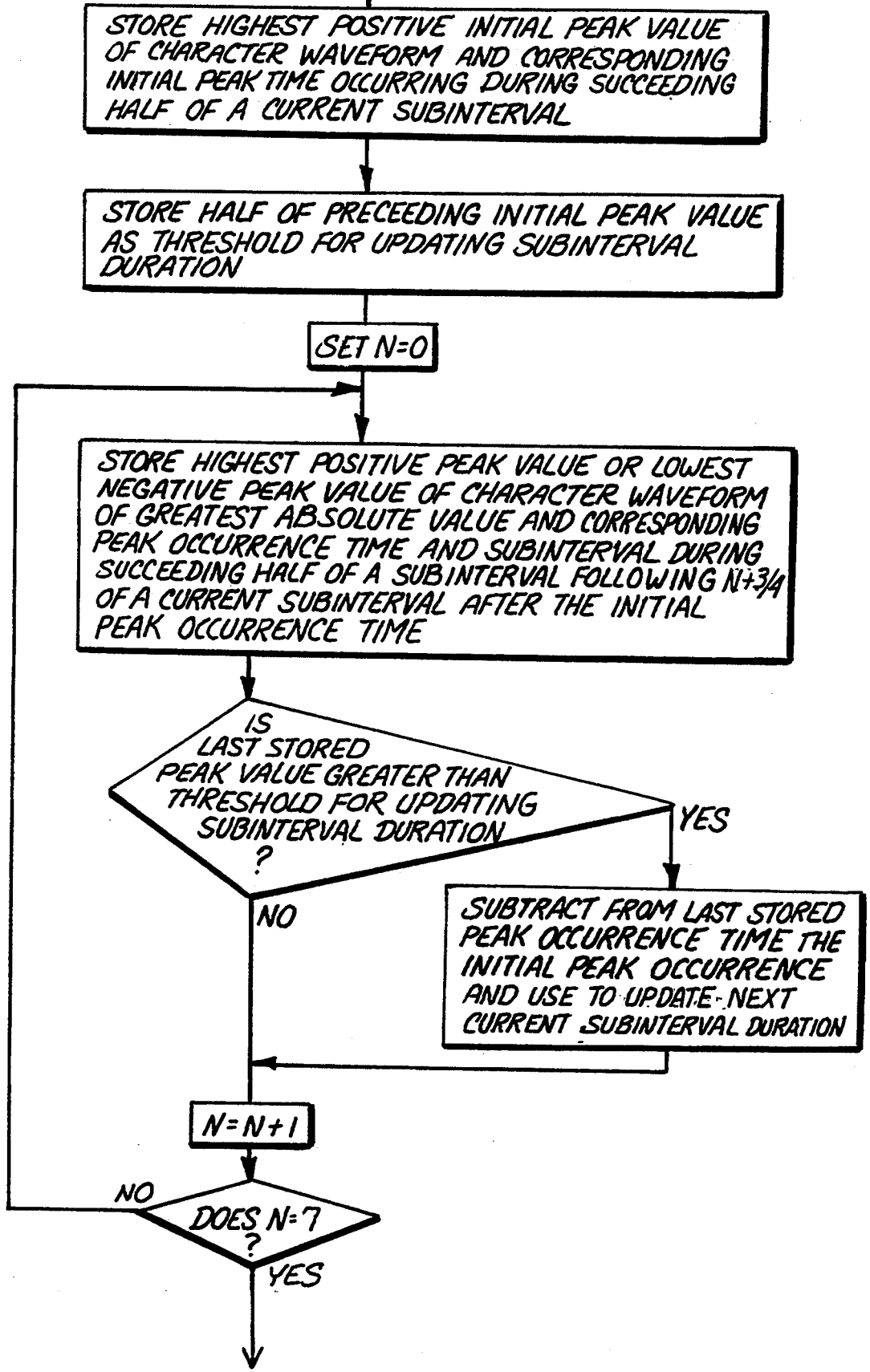
Figure 8B:
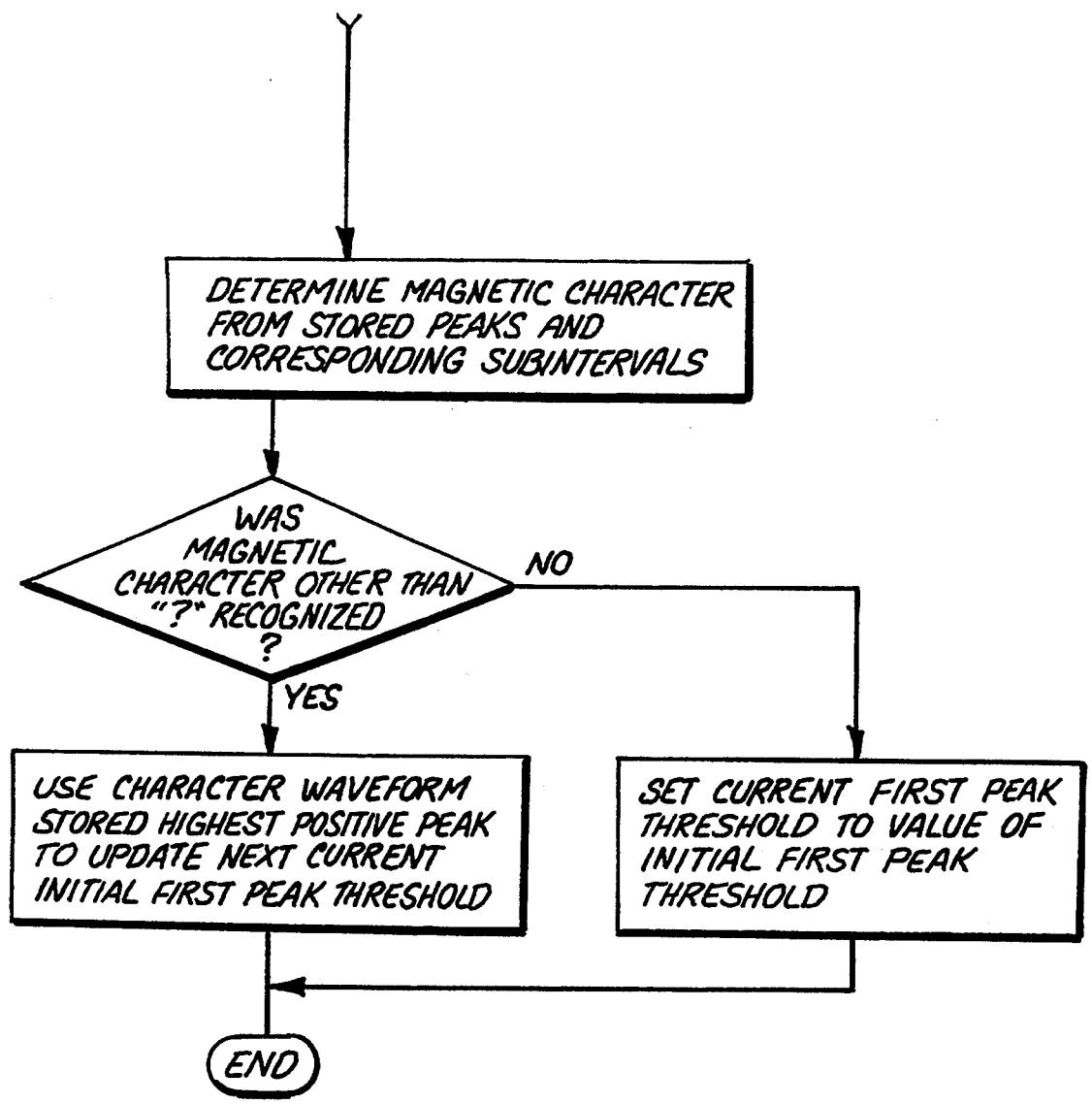

The recognizing of a magnetic character block in FIG. 7B is shown in more detail in FIGS. 8A and 8B. First, the time of the peak in the first subinterval is stored in the First Peak Time Register, and the value of the peak is stored in the Highest Peak Register. This is followed by storing half of the first subinterval peak in the Subinterval Update Threshold Register for updating the subinterval duration, as described above. Thereafter, the highest positive peak and the lowest negative peak for a second subinterval are stored in the Highest Peak and Lowest Peak Registers, and the times of these peaks in the Highest Peak Time and Lowest Peak Time Registers. These peak values are sought during the center half of the second subinterval between the first and last quarters thereof by starting the peak search three-quarters of a subinterval after the time of the peak found in the first subinterval. This in effect makes the peak found in the first subinterval occur at the center of that subinterval, and provides the timing base for the start of succeeding subintervals. Thereafter, the subsequent subinterval duration is updated in the sequence of flow chart entries in the bottom half of FIG. 8A carrying over into FIG. 8B after each subinterval past the first containing a positive peak exceeding the threshold for updating the subinterval duration. In addition in that repeating process portion, the highest positive peak values and lowest negative peak values of the character waveform and the times therefor in the succeeding subintervals are stored in the Highest Peak Register, and the Lowest Peak Register, and the Highest Peak Time Registers and the Lowest Peak Time Register, as appropriate. Once this has been completed for the remaining subintervals, and the completing of the subinterval duration update, peak values found for each subinterval are stored in the Eight Subinterval Peaks Register.

Next, the process for determining a magnetic character from the stored peaks and corresponding subintervals is undertaken as shown in FIG. 8B, and given in more detail in the following flow chart in FIGS. 9A, 9B and 9C. Thereafter, the threshold for the first peak in subinterval 1 is either updated to a current value, or if there was an error in the recognition process, the threshold is set to the initial value obtained from permanent memory.

Figure 9B:
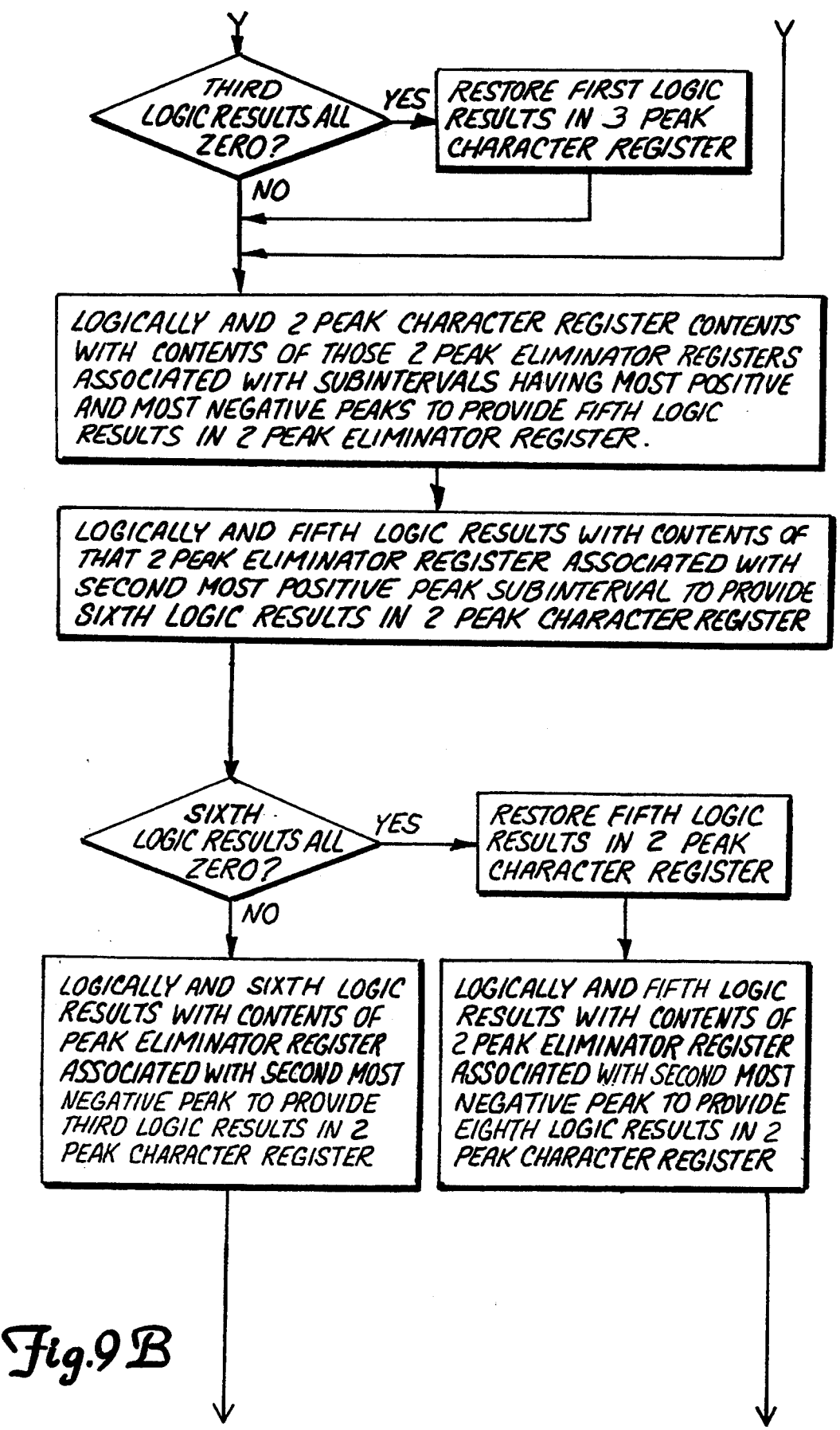
Figure 9C:
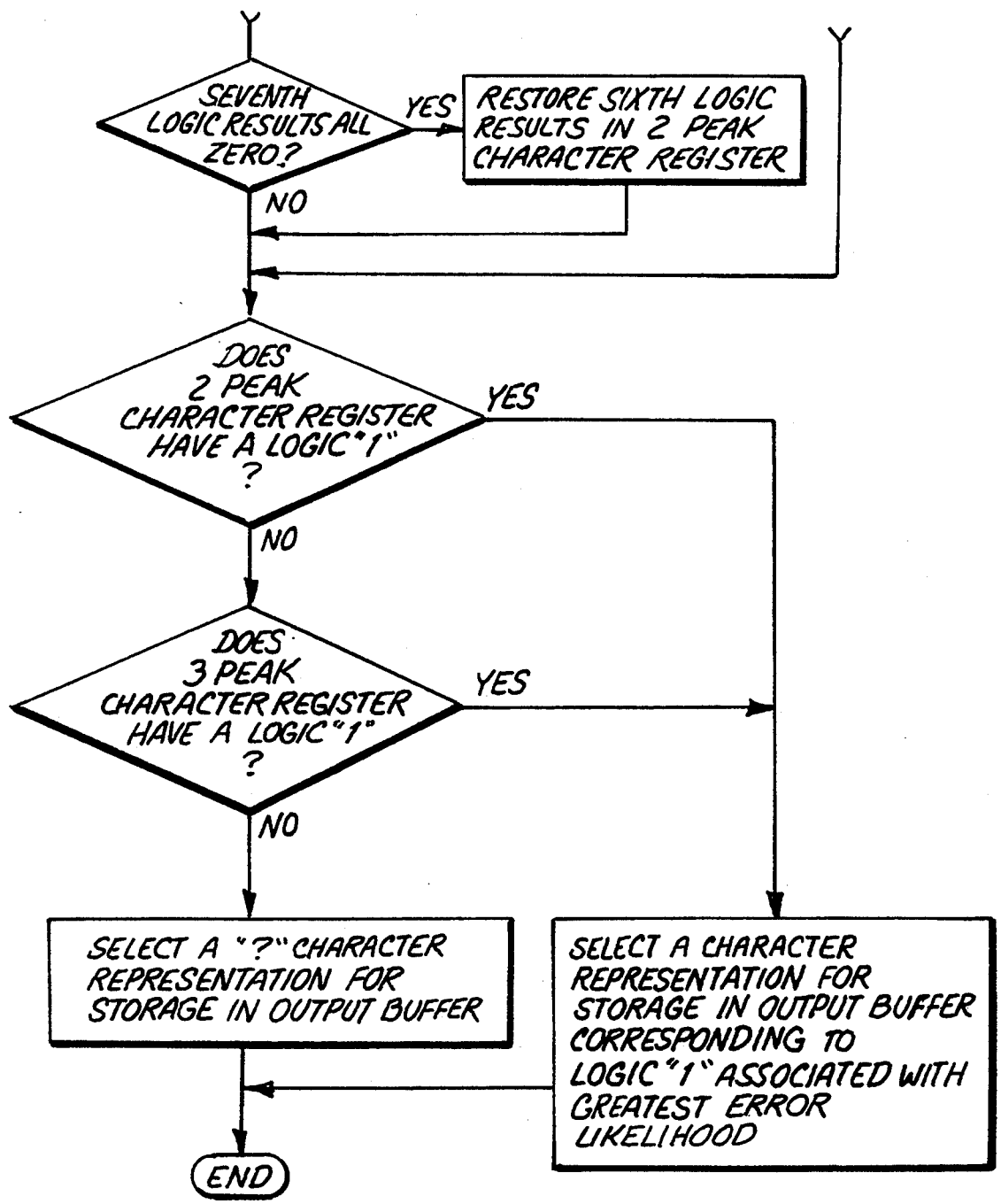

The determining of a magnetic character from the stored peaks and corresponding subintervals previously found, as indicated in the box in FIG. 8B, is shown in greater detail in FIGS. 9A, 9B and 9C, as indicated above. The peaks in the Eight Subinterval Peaks Register are reviewed and the three most positive character waveform peaks are used to indicate which subintervals indications are to be stored in the Three Highest Subintervals Register, and in the three most negative character waveform peaks are used to indicate which subintervals indications are to be stored in the Three Lowest Subintervals Register. The Three (3) Peak and Two (2) Peak Character Registers have ones initially set in each digit position, as described above, to indicate all the characters from the standard set of characters are possible to be associated with the measured character waveform involved with the stored peaks until the eliminating process has eliminated them in favor of one to be associated with that waveform.

The remaining blocks in FIGS. 9A, 9B and 9C set out the logical processes following in selecting the character representation to be stored in the Output Buffer Register in association with a particular measured character waveform. The example given above for the "on us" character illustrates much of this logic, and so an overview of that logic will not be presented here in view of the detailed instructions set out in the flow chart of FIGS. 9A, 9B and 9C in this regard. The result is the selecting of a character from the standard set of characters imprinted on bank checks for machine recognition which has a very high probability of matching that character imprinted on the check giving rise to the measured character waveforms obtained in view of which such a selection process is initiated.

Although the present invention has been described with reference to preferred embodiments, workers skilled in the art will recognize that changes may be made in form and detail without departing from the spirit and scope of the invention.

What is claimed is:

1. A method for acquiring signal representations intended to correspond to those character representations, out of a set of possible known character representations, provided on a nonmagnetic material substrate so as to be capable of establishing corresponding magnetic fields, said method comprising:

moving said substrate along a path past a magnetic field sensor such that magnetic field, each emanating from a corresponding one of said character representations on said substrate, are sensed thereby during corresponding character waveform time intervals to provide measured character waveforms in an output signal thereof, each measured character waveform corresponding to one of said character representations on said substrate, each said time interval having a first predetermined number of successive subintervals, the character representations of said set of possible known character representations each having an expected character waveform provided therefor by a magnetic field sensor if moved thereby on a nonmagnetic substrate;

determining a second predetermined number, less than said first predetermined number, of subintervals for a measured character waveform from the subintervals which form a character waveform time interval thereof by selecting subintervals therein, each of which has a character waveform extremum;

ordering the subintervals of the measured character waveform by extrema thereof;

ordering corresponding subintervals of said character representations of said set of possible known character waveforms by the extrema thereof; and comparing the ordering of the subintervals of the expected character waveform time intervals of the known character representation with the ordering of the character waveform time intervals of the measured character waveform, eliminating, from being selected as matching character representations on said substrate having such measured character waveform, character representation of said set of possible known character representations having associated therewith expected character waveforms in which the ordering of the character waveform extrema occur in subintervals of a corresponding expected character waveform time interval therefor that is different than the ordering of those subintervals corresponding to the respective said subinterval of the measured waveform; and providing a signal representation for such a measured character waveform corresponding to one character representation of said set of possible said character representations remaining after said of eliminating of character representations.

2. The method of claim 1 wherein said determining includes a following further determining of a second peak subinterval in that said character waveform time interval for such a said measured character waveform having therein a next most extreme value of a selected kind; and wherein said eliminating includes a following further eliminating, from being selected as having provided such a said measured character waveform, those of said set of possible character representations remaining that have associated therewith expected character waveforms with a next most extreme value thereof located in a different subinterval of said expected character waveform time interval therefor than that corresponding to said second peak subinterval of said character waveform time interval for such said measured character waveform.

3. The method of claim 1 wherein said character waveform extremum is a maximum of said measured character waveform.

4. The method of claim 1 wherein said set of possible character representations are ranked by likelihoods of error in said providing of signal representations for said character representations on said substrate after said moving thereof past said magnetic field sensor, and wherein said providing of a signal representation for a measured character waveform corresponding to a character representation selected from those of said set of possible character representations remaining after said eliminating further includes, in situations where a plurality of said set of possible character representations still remain, selecting that character representation having an error likelihood that is greatest.

5. The method of claim 1 wherein said determining of a first peak subinterval for a said measured character waveform occurs only if said magnetic sensor has provided an output signal in a selected portion of that measured character waveform which exceeds a selected sensing threshold value for a selected time duration.

6. The method of claim 1 wherein said plurality of subintervals in said succession forming said character waveform time interval for a corresponding measured character waveform are fixed in number but with at least some of them being variable in duration based on speeds attained by said substrate in moving past said magnetic field sensor.

7. The method of claim 2 wherein said determining includes an ordered set of determining of a plurality of peak subintervals, including said first and second peak subintervals, in said character waveform time interval for such a measured character waveform with said plurality of peak subintervals being divisible into two ordered subinterval sets, one said set having subintervals therein containing measured character waveform maxima ordered by magnitude starting with that maximum of greatest value and that remaining said set having subintervals therein containing measured character waveform minima ordered by magnitude starting with that minimum of least value; and wherein said eliminating includes a plurality of selective eliminating of those portions of said set of possible character representations having associated therewith expected character waveforms each having a set of expected subintervals containing maxima in its expected character waveform time interval equal in number to those said subintervals in said set containing measured character waveform maxima and each having a set of expected subintervals containing minima in its expected character waveform time interval equal in number to those said subintervals in said set containing measured character waveform minima such that, if said set of expected subintervals containing maxima is ordered by magnitude starting with that maximum of greatest value and if said set of expected subintervals containing minima is ordered by magnitude starting with that minimum of least value, an ordered comparison demonstrates that at least one of these last two sets for such a said expected character waveform would have a different ordering of subintervals therein than does a corresponding one of said set containing measured character waveform maxima and said set containing measured character waveform minima.

8. The method of claim 2 wherein said character waveform extremum of a selected kind and said next most extreme value of a selected kind are each maximums.

9. The method of claim 5 wherein said selected sensing threshold is adjusted in value in correspondence with any difference in value between a preceding measured character waveform extrema and an expected value for such an extrema.

10. The method of claim 6 wherein said duration of a said subinterval in said character waveform time interval for a measured character waveform is adjusted in value in correspondence with any difference in time elapsing between two preceding extrema in that said measured character waveform and an expected value for such elapsed time based on said duration of a selected said subinterval in said character waveform time interval for a preceding measured character waveform.

11. The method of claim 7 wherein said expected character waveforms for said set of possible character representations can be divided into two groups with said expected character waveforms having differing numbers of maxima above a selected value in each said group and differing numbers of minima below a selected value in each said group, and said ordered comparison being accomplished through use of one of said groups of said expected character waveforms with said set containing measured character waveform maxima and said set containing measured character waveform minima followed by use of that other said group of said expected character waveforms remaining with said set containing measured character waveform maxima and said set containing measured character waveform minima.

12. A character recognizer for providing signal representations intended to correspond to those character representations, out of a set of possible character representations, provided on a nonmagnetic material substrate so as to be capable of establishing corresponding magnetic fields, said recognizer comprising:

a substrate moving means capable of moving said substrates along a selected path;

a magnetic field sensor capable of sensing magnetic fields correspondingly emanating from said character representations on said substrate moving along said selecting path to provide a measured character waveform over a character waveform time interval corresponding to each said character representation so sensed, said time interval having a first predetermined plurality of subintervals;

a determination means for determining a second predetermined number of subintervals less than said first predetermined number for a measured character waveform from a plurality of subintervals which in succession form said character waveform time interval thereof, comprising means for selecting subintervals therein having at least one character waveform extremum;

means for ordering the subintervals of the measured character waveform by extrema thereof;

means for ordering corresponding subintervals of character representations of said set of possible known character waveforms by the extrema thereof; and means for comparing the ordering of the subintervals of the expected character waveform time intervals of the known character representation with the ordering of the character waveform time interval of the measured character waveform, an eliminating means for selectively eliminating, from being selected as matching a character representation on said substrate that was sensed to provide said measured character waveform, character representations of said set of possible character representations having associated therewith expected character waveforms in which the respective selected kind of extremum occurs in a subinterval of a corresponding expected character waveform time interval therefor that is different than that subinterval corresponding to the respective subinterval of said time interval; and a selection means for providing a signal representation for such a said measured character waveform corresponding to one character representation of said set of possible character representations remaining after said eliminating of said portion of said set of possible character representations.

13. A method for acquiring signal representations intended to correspond to those character representations, out of a set of possible character representations, provided on a nonmagnetic material substrate so as to be capable of establishing corresponding magnetic fields, said method comprising:

moving said substrate along a path past a magnetic field sensor such that magnetic fields, each emanating from a corresponding one of said character representations on said substrate, are sensed thereby during corresponding character waveform time intervals to provide measured character waveforms in an output signal thereof, each measured character waveform corresponding to one of said character representations on said substrate, each said time interval having a first predetermined number of successive subintervals, the character representations of said set of possible character representations each having an expected character waveform provided therefor by a magnetic field sensor if moved thereby on a nonmagnetic substrate;

determining a second predetermined number, less than said first predetermined number, of subintervals for a measured character waveform from the subintervals which form a character waveform time interval thereof by selecting subintervals therein, each of which having a character waveform extremum;

eliminating, from being selected as matching character representation on said substrate having such measured character waveform, character representation of said set of possible character representations having associated therewith expected character waveforms in which the respective character waveform extremum occurs in a subinterval of a corresponding expected character waveform time interval therefor that is different than that subinterval corresponding to the respective said subinterval; and providing a signal representation for such a measured character waveform corresponding to one character representation of said set of possible said character representations remaining after said step of eliminating of character representation, said determining includes a following further determining of a second peak subinterval in that said character waveform time interval for such a said measured character waveform having therein a next most extreme value of a selected kind, said eliminating includes a following further eliminating, from being selected as having provided such a said measured character waveform, those of said set of possible character representations remaining that have associated therewith expected character waveforms with a next most extreme value thereof of a selected kind located in a different subinterval of said expected character waveform time interval therefor than that corresponding to said second peak subinterval of said character waveform time interval for such said measured character waveform.

14. The method of claim 13 wherein said determining includes an ordered set of determining of a plurality of peak subintervals, including said first and second peak subintervals, in said character waveform time interval for such a measured character waveform with said plurality of peak subintervals being divisible into two ordered subinterval sets, one said set having subintervals therein containing measured character waveform maxima ordered by magnitude starting with that maximum of greatest value and that remaining said set having subintervals therein containing measured character waveform minima ordered by magnitude starting with that minimum of least value; and wherein said eliminating includes a plurality of selective eliminating of those portions of said set of possible character representations having associated therewith expected character waveforms each having a set of expected subintervals containing maxima in its expected character waveform time interval equal in number to those said subintervals in said set containing measured character waveform maxima and each having a set of expected subintervals containing minima in its expected character waveform time interval equal in number of those said subintervals in said set containing measured character waveform minima such that, if said set of expected subintervals containing maxima is ordered by magnitude starting with that maximum of greatest value and if said set of expected subintervals containing minima is ordered by magnitude starting with that minimum of least value, an ordered comparison demonstrates that at least one of these last two sets for such a said expected character waveform would have a different ordering of subintervals therein than does a corresponding one of said set containing measured character waveform maxima and said set containing measured character waveform minima.

15. The method of claim 14 wherein said character waveform extremum of a selected kind and said next most extreme value of a selected kind are each maximums.

16. The method for acquiring signal representations intended to correspond to those character representations, out of a set of possible character representations, provided on a nonmagnetic material substrate so as to be capable of establishing corresponding magnetic field, said method comprising:

moving said substrate along a path past a magnetic field sensor such that magnetic fields, each emanating from a corresponding one of said character representations on said substrate, are sensed thereby during corresponding character waveform time intervals to provide measured character waveforms in an output signal thereof, each measured character waveform corresponding to one of said character representations on said substrate, each said time interval having a first predetermined number of successive subintervals, the character representations of said set of possible character representations each having an expected character waveform provided therefor by a magnetic field sensor if moved thereby on a nonmagnetic substrate;

determining a second predetermined number, less than said first predetermined number, of subintervals for a measured character waveform from the subintervals which form a character waveform time interval thereof by selecting subintervals therein, each of which having a character waveform extremum;

eliminating, from being selected as matching character representation on said substrate having such measured character waveform, character representation of said set of possible character representations having associated therewith expected character waveforms in which the respective character waveform extremum occurs in a subinterval of a corresponding expected character waveform time interval therefor that is different than that subinterval corresponding to the respective said subinterval; and providing a signal representation for such a measured character waveform corresponding to one character representation of said set of possible said character representations remaining after said step of eliminating of character representation, said set of possible character representations are ranked by likelihoods of error in said providing of signal representations for said character representations on said substrate after said moving thereof past said magnetic field sensor, and wherein said providing of a signal representation for a measured character waveform corresponding to a character representation selected from those of said set of possible character representations remaining after said eliminating further includes, in situations where a plurality of said set of possible character representations still remain, selecting that character representation having an error likelihood that is greatest.

17. A method of acquiring signal representations intended to correspond to those character representations, out of a set of possible character representations, provided on a nonmagnetic material substrate so as to be capable of establishing corresponding magnetic fields, said method comprising:

moving said substrate along a path past a magnetic field sensor such that magnetic fields, each emanating from a corresponding one of said character representations on said substrate, are sensed thereby during corresponding character waveform time intervals to provide measured character waveforms in an output signal thereof, each measured character waveform corresponding to one of said character representations on said substrate, each said time interval having a first predetermined number of successive subintervals, the character representations of said set of possible character representations each having an expected character waveform provided therefor by a magnetic field sensor if moved thereby on a nonmagnetic substrate;

determining a second predetermined number, less than said first predetermined number, of subintervals for a measured character waveform from the subintervals which form a character waveform time interval thereof by selecting subintervals therein, each of which having a character waveform extremum;

eliminating, from being selected as matching character representation on said substrate having such measured character waveform, character representation of said set of possible character representations having associated therewith expected character waveforms in which the respective character waveform extremum occurs in a subinterval of a corresponding expected character waveform time interval therefor that is different than that subinterval corresponding to the respective said subinterval; and providing a signal representation for such a measured character waveform corresponding to one character representation of said set of possible said character representations remaining after said step of eliminating of character representation, said determining of a first peak subinterval for a said measured character waveform occurs only if said magnetic sensor has provided an output signal in a selected portion of that measured character waveform which exceeds a selected sensing threshold value for a selected time duration.

18. The method of claim 17 wherein said selected sensing threshold is adjusted in value in correspondence with any difference in value between a preceding measured character waveform extrema and an expected value for such an extrema.

19. A method for acquiring signal representations intended to correspond to those character representations, out of a set of possible character representations, provided on a nonmagnetic material substrate so as to be capable of establishing corresponding magnetic fields, said method comprising:

moving said substrate along a path past a magnetic field sensor such that magnetic fields, each emanating from a corresponding one of said character representations on said substrate, are sensed thereby during corresponding character waveform time intervals to provide measured character waveforms in an output signal thereof, each measured character waveform corresponding to one of said character representations on said substrate, each said time interval having a first predetermined number of successive subintervals, the character representations of said set of possible character representations each having an expected character waveform provided therefor by a magnetic field sensor if moved thereby on a nonmagnetic substrate;

determining a second predetermined number, less than said first predetermined number, of subintervals for a measured character waveform from the subintervals which form a character waveform time interval thereof by selecting subintervals therein, each of which having a character waveform extremum;

eliminating, from being selected as matching character representation on said substrate having such measured character waveform, character representation of said set of possible character representations having associated therewith expected character waveforms in which the respective character waveform extremum occurs in a subinterval of a corresponding expected character waveform time interval therefor that is different than that subinterval corresponding to the respective said subinterval; and providing a signal representation for such a measured character waveform corresponding to one character representation of said set of possible said character representations remaining after said step of eliminating of character representation, said plurality of subintervals in said succession forming said character waveform time interval for a corresponding measured character waveform are fixed in number but with at least some of them being variable in duration based on speeds attained by said substrate in moving past said magnetic field sensor.

20. The method of claim 18 wherein said duration of a said subinterval in said character waveform time interval for a measured character waveform is adjusted in value in correspondence with any difference in time elapsing between two preceding extrema in that said measured character waveform and an expected value for such elapsed time based on said duration of a selected said subinterval in said character waveform time interval for a preceding measured character waveform.

* * * * *